May 20, 1924.
J. A. COOK
TUBULAR FISHING ROD
Filed June 13, 1923
1,494,530
*Fig. 1.*
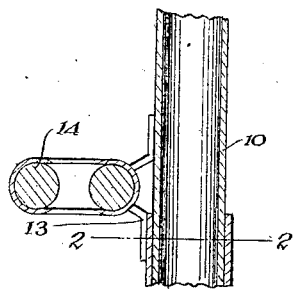
*Fig. 2.*
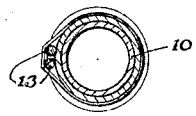
*Fig. 3.*
*Fig. 4.*
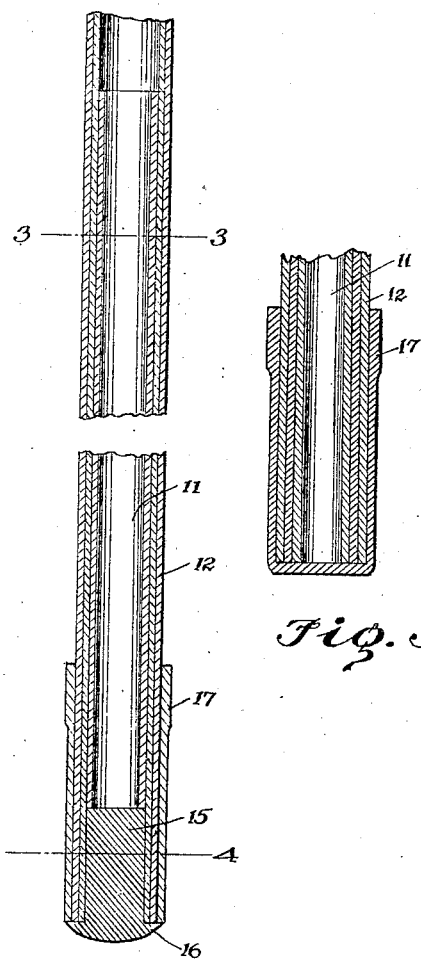
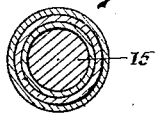
*Fig. 5.*
*Fig. 6.*
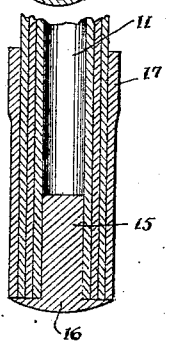
Inventor
John A. Cook.
By
Clarkson
Attorney Patented May 20, 1924.

1,494,530

UNITED STATES PATENT OFFICE.

JOHN A. COOK, OF EVANSTON, ILLINOIS, ASSIGNOR TO RICHARDSON ROD & REEL COMPANY, OF CHICAGO, ILLINOIS, A CORPORATION OF ILLINOIS.

TUBULAR FISHING ROD.

Application filed June 13, 1923. Serial No. 645,135.

*To all whom it may concern:*

Be it known that JOHN A. COOK, citizen of the United States, residing at Evanston, in the county of Cook and State of Illinois, has invented certain new and useful Improvements in Tubular Fishing Rods, of which the following is a specification.

This invention relates to fishing rods, and has special reference to a tubular steel fishing rod.

More particularly the invention relates to improvements in the fishing rod, described and shown in the patent to Homer E. Rawson, Number 1,385,149.

In said patent there is disclosed a reinforcement for tubular fishing rods at the lower ferrule of the section, such reinforcement consisting of an inner tube extending from the butt end of the section toward the other end thereof, and an outer tube fitted on the section and terminating toward the butt end in a tapered extremity fitted beneath the end of the ferrule remote from the butt.

Experience has shown that this method of reinforcement is defective in part, due to weakness at the connection between the outer or top end of the ferrule and the outer reinforcement.

The principal and most important object of the invention is to provide an improved construction of the reinforcement at this point which is so arranged that the defects above mentioned are entirely eliminated.

With the above and other objects in view, as will be hereinafter apparent, the invention consists in general of certain novel details of construction and combinations of parts hereinafter more fully described, illustrated in the acompanying drawings, and specifically claimed.

In the accompanying drawings like characters of reference indicate like parts in the several views, and:

Fig. 1 is an enlarged sectional view taken longitudinally through a fragmentary portion of the butt end of a fishing rod section constructed in accordance with this invention.

Fig. 2 is a section on the line 2—2 of Fig. 1.

Fig. 3 is a section on the line 3—3 of Fig. 1.

Fig. 4 is a section on the line 4—4 of Fig. 1.

Fig. 5 is a sectional view of the inner or butt end of a section reinforced in a modified manner.

Fig. 6 is a similar view of a second modification.

In the embodiment of the invention disclosed in Figures 1 to 4, there is shown a rod section comprising a body 10, having secured in the bore thereof an inner strengthening member or sleeve 11 of tubular form, and located at the butt portion of the section. Similarly, there is provided an outer tubular reinforcement or sleeve 12. The inner reinforcement 11 terminates somewhat short of the holder 13 for the first ring guide 14 of the section, while the outer reinforcement 12 extends beneath said holder, this construction being clearly shown in Figures 1 and 2.

There is fitted in the inner or butt end of the body 10 a plug 15 having a peripheral flange or shoulder 16, and this flange or shoulder rests against the inner or butt end of the section, and has the butt end of the outer reinforcement 12 resting thereagainst. The inner reinforcement 11 terminates against the inner end of the plug 15. Surrounding the butt portion of the outer reinforcement is a ferrule 17, and it is to be observed that the outer reinforcement extends entirely to the bottom end of the ferrule, so that the outer reinforcement is held securely in position by this extension, and there is no possibility of it becoming loosened under the bending stresses incident to fishing, as is the case with the device shown in the patent to Rawson, above mentioned.

Furthermore, the ferrule butts against the flange 16, and by brazing the parts at this point, a very strong and substantial reinforcement is made at the butt.

In the form shown in Fig. 5, it will be observed that the ferrule 17 has a closed end, and that the inner reinforcement member extends down to and butts against this closed end.

In the form shown in Fig. 6 it will be seen that the plug 16 has its shank made small enough to permit the inner reinforcing member to extend down to and butt against the head of said plug.

Thus in each form both the rod body 10 and the two reinforcing members butt against the end closure of the rod section and in the last two forms the inner and outer reinforcing members extend to the inner or butt end of the ferrule.

In this manner, a marked improvement has been made over the prior device, and one which has been found in practice to be highly superior thereto.

There has thus been provided a simple and efficient device of the kind described and for the purpose specified.

Having thus described the invention, what is claimed as new, is:

1. A fishing rod section comprising a resilient metallic tube forming the section body, an outer reinforcement at the butt joint portion of said section, said reinforcement extending fully to the butt end of the body, said reinforcement terminating at its other end in spaced relation to said butt end.

2. In a fishing rod, a rod section having a tubular metallic body, an outer tubular reinforcement on the butt joint portion of said body and terminating flush with the butt end of the body, and a ferrule surrounding the reinforcement at the butt portion thereof and having its butt end flush with the butt ends of the tubular body and reinforcement, said reinforcement extending away from the butt beyond the forward end of the ferrule.

3. In a fishing rod, a rod section having a tubular metallic body, an outer tubular reinforcement on the butt joint portion of said body and terminating flush with the butt end of the body, a ferrule surrounding the reinforcement at the butt portion thereof and having its butt end flush with the butt ends of the tubular body and reinforcement, and a plug fitted in the butt end of the body and having a peripheral shoulder against which the butt ends of the body, the reinforcement and the ferrule bear.

4. In a fishing rod, a rod section having a tubular metallic body, an outer tubular reinforcement on the butt joint portion of said body and terminating flush with the butt end of the body, a ferrule surrounding the reinforcement at the butt portion thereof and having its butt end flush with the butt ends of the tubular body and reinforcement, a plug fitted in the butt end of the body and having a peripheral shoulder against which the butt ends of the body, the reinforcement, and the ferrule bear, and a tubular interior reinforcement fitted within the body and having its butt end bearing against the inner end of said plug.

5. In a fishing rod, a section comprising a tubular body and reinforcing means at one end thereof, said reinforcing means comprising an inside sleeve, an outside sleeve, and a ferrule surrounding the end portion of the reinforcement, said outside sleeve extending the full length of said ferrule, said inside sleeve terminating beyond the outer end of said ferrule.

6. In a fishing rod, a tubular rod section or joint, a closure for the inner or butt end of said joint, an outer reinforcing member extending from the inner or butt end of said joint towards the outer or tip end thereof, a ferrule surrounding the inner or butt portion of the outer reinforcing member and extending outwardly thereon from said closure, and an inner reinforcing member within the joint and extending from the closure towards the outer or tip portion of the joint, said reinforcing members terminating outwardly beyond the outer end of the ferrule.

In testimony whereof I affix my signature.

JOHN A. COOK.